Jan. 5, 1965     C. A. TAMARIN     3,164,234
SPRAG CLUTCH WITH ELECTRIC ENERGIZER
Filed Nov. 21, 1960
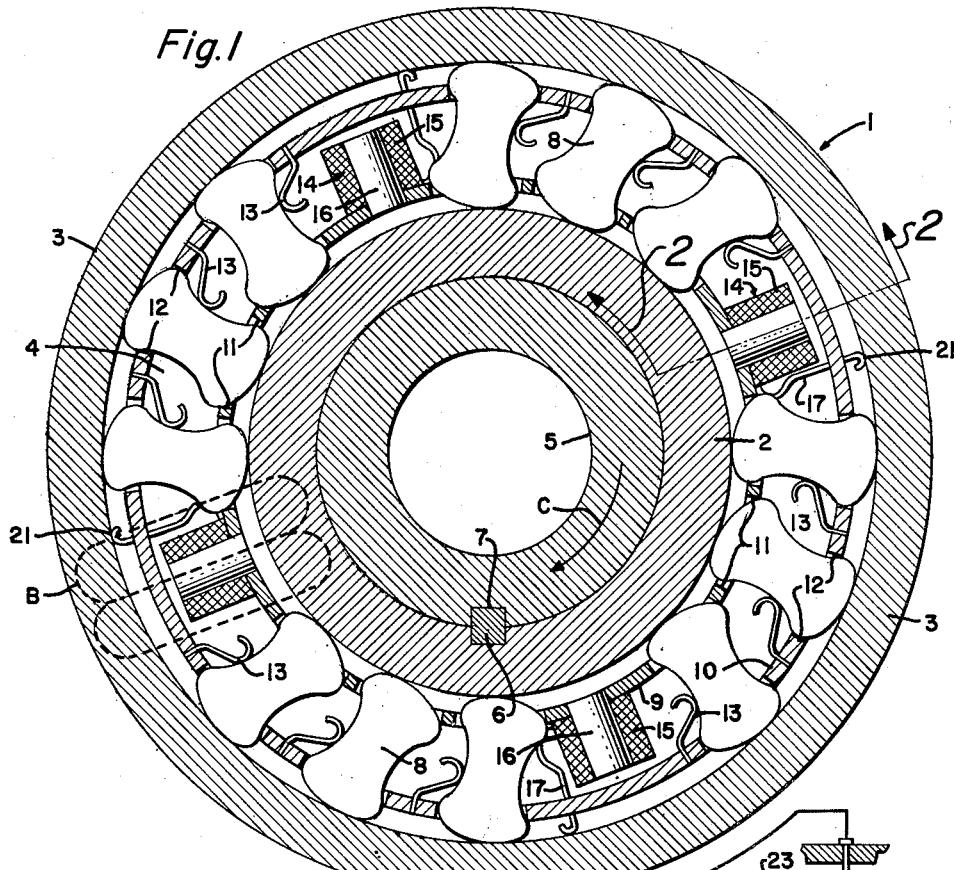
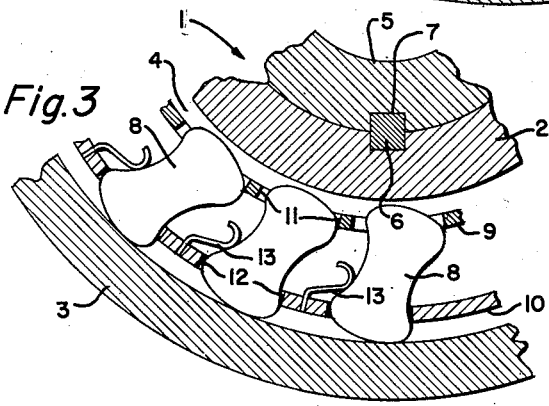
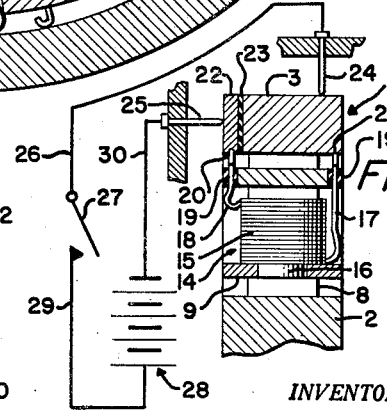
INVENTOR.
CARL A. TAMARIN
BY
*Herschel C. Omohundro*
ATTORNEY United States Patent Office
3,164,234
Patented Jan. 5, 1965

3,164,234
SPRAG CLUTCH WITH ELECTRIC ENERGIZER
Carl A. Tamarin, Phoenix, Ariz., assignor to The Garrett Corporation, Los Angeles, Calif., a corporation of California
Filed Nov. 21, 1960, Ser. No. 70,900
9 Claims. (Cl. 192—40)

The present invention relates generally to overrunning clutches and is more particularly directed to overrunning clutches of the pawl or sprag type.

Overrunning or one-way clutches of the sprag type usually employ radially spaced, concentric, circular, inner and outer races and a plurality of caged pawls disposed in an annular row in the space between said races. These pawls are somewhat longer than the radial dimension of the annulus in which they are positioned and are all canted in the same direction relative to radii which extend from the common center of the races through each pawl. Due to the length differential between the pawls and the radial dimensions of the annulus, the pawls may be wedged tightly against both races if said pawls are urged toward radial alignment. When this is done, the races are connected for joint rotation and torque transmission in one direction. The pawls are released from torque transmitting engagement with the races when the normal cant of the pawls is increased.

The most common method of manipulating the pawls to urge them into or away from torque transmitting engagement with the races is to provide means in the clutch which will force all the pawls to be in constant frictional contact with both races. In this way, when one of the races is rotated in the proper direction, the pawls are biased by friction with this race toward radial alignment and a driving connection is established. Oppositely directed rotation of the race will tend to cant the pawls toward a position which allows one of the races to slip relative to the pawls and the driving relation is interrupted, but clearance between the pawls and races is not permitted.

The constant dragging of the pawls on the driving race, although necessary with most prior devices, is undesirable due to a tendency for rubbing parts to produce heat. When these parts are operated at high speeds relative to each other, the heat produced becomes very excessive and tends to reduce the life and reliability of the clutch.

The present invention is proposed to overcome the above-mentioned problem by providing a clutch which permits positive clearance between the pawls and races to completely eliminate frictional contact between these parts during the overrunning phase of operation. This function is made possible by the inclusion of resilient means which urge the pawls from engagement with the races, and separate means which act in opposition to said resilient means, at predetermined times, to positively engage the pawls with the races irrespective of the clearance between said pawls and races.

It is therefore an object of the present invention to provide novel means for selectively engaging and disengaging detents with torque transmitting elements in overrunning clutches and similar devices.

Another object of this invention is to provide an overrunning clutch which is constructed to positively prevent frictional contact between the driving element and the driven elements thereof during the overrunning condition.

A further object of the invention is to provide means constructed to be disposed entirely within an overrunning clutch, such means being capable of reliably and positively engaging detents with the driving and driven members of said clutch when the driving phase is to be established.

A still further object of the invention is to provide the combination of resilient and electromagnetic means for use in sprag type clutches to actuate the pawls in such clutches.

Another object of the invention is to provide sprag clutches comprising electromagnetic means constructed to actuate the pawl cages in such clutches, this function being employed to position pawls for engagement with the clutch races.

A further object of this invention is to provide means which create magnetic drag between the driving race of a sprag clutch and the pawl cage thereof, causing joint rotation of both cage and race to engage pawls for torque transmitting operation.

These and other objects and advantages of the invention will be more fully appreciated with information gained from the following detailed description and accompanying drawing wherein:

FIG. 1 is a transverse sectional view depicting one form of a device constructed in accordance with the principles of the present invention;

FIG. 2 is a fragmentary sectional view taken on a plane indicated by line 2—2 of FIG. 1; and FIG. 3 is a fragmentary transverse sectional view of the device showing certain parts thereof in disengaged position for the overrunning phase of operation of the clutch.

In the drawing, a clutch incorporating the invention is designated generally by the numeral 1 and comprises a pair of concentrically disposed inner and outer races 2 and 3, respectively, radially separated to define an annular space 4. In use, the inner race 2 is secured for rotation with a shaft 5 by suitable means such as a key 6 disposed in complemental keyway 7 formed in the shaft and inner race. Either the inner race 1 or the outer race 2 may be employed as the driving race, but for convenience the inner race 2 is so designated in the present specification. It will be understood, therefore, that the inner race 2 is connected through the shaft 5 to a source of rotary power and the outer race 3 is connected, by means not shown, to a load.

A plurality of detents in the form of pawls 8 are disposed in the annular space 4. Although other arrangements are obviously possible, the device disclosed herewith is constructed to have the pawls 8 in four groups of three pawls each, these groups being separated by a space provided to receive other structure which will be described hereinafter. The relative positions of the pawls 8 are determined by annular inner and outer cage elements 9 and 10, respectively, which are concentrically arranged in spaced relation to the races 2 and 3, and are provided with apertures 11 and 12 which receive the ends of the pawls 8. The overall length of each pawl 8 is greater than the radial dimensions of the space 4 in which they are disposed, and all of the pawls are necessarily inclined in the same direction at an angle to the radii which extend from the central axis of the shaft 5 through each of the pawls. This angle may be increased or decreased depending upon the relative angular positions of the apertures 11 and 12.

A set of cantilever springs 13 are disposed between the apertures 12 and attached at one end to the outer cage member 10. Each of these springs extends inwardly from its point of attachment to engage one of the pawls 8, and all of the springs are preloaded to resiliently urge said pawls away from engagement with the inner race 2.

Electromagnets 14 are mounted at 90-degree intervals on the inner cage 9 and are disposed between this cage and the outer cage 10 in a vacancy left for the purpose. As shown in FIGS. 1 and 2, each of the magnets 14 comprises a winding 15 of suitably insulated, electrically conductive wire mounted on a core 16 formed from soft iron or other suitable material. Lead wires 17 and 18, having an electrical connection with the windings 15, extend through insulating grommets 19 which are disposed at the sides of the outer cage 10. The leads 17 and 18 terminate in hooks or loops 20 and 21, one set thereof having rubbing contact with an electrical conductor in the form of a ring 22, which is bonded or otherwise attached to the outer race 3, and the other set having similar contact with the outer race 3. The ring 22 and the race to which it is attached are electrically insulated from each other by a washer 23 composed of suitable dielectric material.

A terminal 24 is provided in the construction shown in FIG. 2 and has rubbing contact with the outer race 3. Similarly, another terminal 25 of like construction has rubbing contact with the ring 22. An electrical conductor 26 extends from the terminal 24 to a switch 27. The switch 27 is connected to one pole of a battery 28 or other source of electrical power by a conductor 29. Another conductor 30 extends from the opposite pole of the battery 28 to the terminal 25 to complete the circuit.

The pawls 8 are normally disengaged from the inner race 2 by the resilient force of the springs 13. This condition may be seen in FIG. 3 where a definite clearance is shown between the pawls 8 and the inner race 2. The shaft 5 and race 2 are therefore normally free to rotate in either direction without disturbing any other part of the mechanism, and conversely, the outer race 3 may also rotate in either direction carrying the pawls, cages, springs, and magnets without affecting the race 2 or shaft 5.

When the magnets 14 are energized by closing the switch 27, a magnetic field is created, as indicated by the dotted lines at B. The inner race 2 is preferably formed from ferromagnetic material and may be attracted to the magnets 14 by lines of force in the field B. The cage members 9 and 10 and the outer race 3 are preferably formed from nonmagnetic material and hence are not influenced by the magnetic field, although the lines of force may extend into these elements of the clutch. The field B completely collapses when the switch 27 is opened.

From the foregoing description it will be apparent that if the magnets 14 are energized while the shaft 5 and inner races are turning in the direction indicated by the arrow C (shown in FIG. 1), the lines of force in the field B create drag between the inner race 2 and the magnets 14. The drag thus produced tends to carry the magnets 14 and inner cage elements 9 with the inner race 2. With this movement the rearward side of each of the apertures 11 engages the rearward side of the pawls 8. Since the outer cage 10 is not affected by the magnetic field B, it will remain relatively stationary and the outer ends of the pawls 8 pivot in the apertures 12 in opposition to the resilient force of the springs 13 until the opposite ends of said pawls are engaged with the inner race 2. Once the pawls 8 are in contact with the inner race 2, friction between the pawls and the inner race will urge all the pawls toward radial alignment and wedge them firmly between both races. After the pawls are engaged with the races, the magnets 14 may be de-energized. Positive engagement of the pawls with the races permits torque to be transmitted through the clutch from a source of rotary power to a load. The pawls 8 will continue to remain engaged with the races until the direction of torque transmission is reversed or stopped, whereupon the force of springs 13 will disengage the pawls from the inner race 2 and permit the clutch to overrun.

I claim:

1. In an overrunning clutch, the combination comprising: driving and driven races disposed in spaced concentric relationship; a plurality of detents disposed between said races for engagement therewith to establish a motion-transmitting relationship therebetween and disengagement therefrom to interrupt the motion-transmitting relationship; adjustable cage means operative to maintain predetermined spacing of said detents; and magnetic means operative when energized to utilize the movement of one of said races to cause the adjustment of said cage means to position said detents in motion-transmitting relation with said races.

2. In an overrunning clutch, the combination comprising: driving and driven races disposed in spaced concentric relationship; a plurality of detents disposed between said races for engagement therewith to establish a motion-transmitting relationship therebetween and disengagement therefrom to interrupt the motion-transmitting relationship; resilient means tending to urge said detents from engagement with at least one of said races; adjustable cage means operative to maintain predetermined spacing of said detents; and electromagnetic means operative when energized to utilize the movement of one of said races to cause the adjustment of said cage means to position said detents in motion-transmitting relation with said races.

3. In an overrunning clutch, the combination comprising: driving and driven races disposed in spaced concentric relationship; a plurality of detents disposed between said races for engagement therewith to establish a motion-transmitting relationship therebetween and disengagement therefrom to interrupt the motion-transmitting relationship; adjustable cage means operative to maintain predetermined spacing of said detents; and magnetic means disposed to create a magnetic drag between said magnetic means and one of said races, such drag serving to adjust said cage means to cause engagement of said detents with said races when said driving race tends to rotate faster than said driven race and disengagement of said detents from at least one of said races when said driven race tends to rotate faster than said driving race.

4. In an overrunning clutch, the combination comprising: inner and outer race means disposed in spaced concentric relation to each other; a plurality of detents disposed between said races for selective engagement therewith; inner and outer cage means to maintain predetermined spacing of said detents; spring means connected with one of said cages and in engagement with said detents to resiliently urge said detents from driving engagement with said races; and electromagnetic means supported by the cage nearest the driving race, said electromagnetic means being adapted to selectively generate a magnetic field with lines of force extending from said magnetic means to the adjacent race to cause rotation of the cage supporting said magnetic means with said driving race for engaging said detents with said races.

5. In an overrunning clutch, the combination comprising: inner and outer race elements disposed in spaced concentric relationship; means for establishing a one-way rotary motion-transmitting connection between said race elements, said means having a plurality of sprag members of a length greater than the spacing between said race elements and inner and outer relatively movable cage sections; and electromagnetic means disposed in the space between said race elements and operative when energized during rotary motion of one of said race elements to cause relative rotary motion between said cage sections whereby said sprag members will be moved into motion-transmitting relation with said race members.

6. In an overrunning clutch, the combination comprising: inner and outer race elements disposed in spaced concentric relationship; means for establishing a one-way rotary motion-transmitting connection between said race elements, said means having a plurality of sprag members of a length greater than the spacing between said race elements and inner and outer relatively movable cage sections; resilient means normally tending to move said cage sections relative to one another to remove said sprag members from motion-transmitting positions; and electromagnetic means disposed in the space between said race elements and operative when energized during rotary motion of one of said race elements to cause relative rotary motion between said cage sections in opposition to said resilient means whereby said sprag members will be returned to motion-transmitting relation with said race members.

7. In an overrunning clutch, the combination comprising: driving and driven races disposed in spaced concentric relationship; a plurality of pawls disposed between said races, each of said pawls being of a length greater than the radial width of the space between said races; cage means having two relatively movable parts with openings for receiving end portions of said pawls, relative movement in a predetermined direction between the parts of said cage means serving to disengage the ends of the pawls from the driving race; resilient means normally tending to cause relative movement in said predetermined direction between said cage parts; and electromagnetic means disposed to establish the magnetic attraction of said electromagnetic means and said driving race to cause relative movement in a direction opposite said predetermined direction between said cage parts, such movement serving to engage the ends of the pawls with the driving and driven races and establish a driving connection therebetween.

8. In an overrunning clutch, the combination comprising: driving and driven races disposed in spaced concentric relationship; a plurality of pawls disposed between said races, each of said pawls being of a length greater than the radial width of the space between said races; cage means having two relatively movable parts with openings for receiving end portions of said pawls, relative movement in a predetermined direction between the parts of said cage means serving to disengage the ends of the pawls from the driving race; spring means carried by one part of said cage means and engaged with said pawls, the force of said spring means serving to cause relative movement in said predetermined direction between said cage parts; and electromagnetic means disposed to establish the magnetic attraction of the same to said driving race to cause relative movement in a direction opposite said predetermined direction between said cage parts, such movement serving to engage the ends of the pawls with the driving and driven races and establish a driving connection therebetween.

9. In an overrunning clutch, the combination comprising: driving and driven races disposed in spaced concentric relationship; a plurality of pawls disposed between said races, each of said pawls being of a length greater than the radial width of the space between said races; inner and outer cage means in the space between said races, said cage means having openings for receiving said pawls, relative rotary movement between said inner and outer cage means in a predetermined direction serving to increase the angular relation of the longitudinal axes of said pawls with respect to radial lines extending from the axis of said races through said pawls and thus decrease the effective lengths of said pawls; resilient means tending to impart relative movement in such direction to said cage means whereby said pawls will be disengaged from the driving race; and electromagnetic means carried by a portion of said cage means for causing the same to tend to rotate with said driving race, such tendency imparting relative movement to said cage means in a direction opposite said predetermined direction to decrease the angular relation of the longitudinal axes of said pawls with respect to radial lines extending from the axis of said races and thus increase the effective lengths of said pawls to cause engagement of the ends thereof with said driving and driven races.

References Cited in the file of this patent
UNITED STATES PATENTS

| | | |
|---|---|---|
| 2,300,223 | Hottenroth | Oct. 27, 1942 |
| 2,520,004 | Gondek | Aug. 22, 1950 |
| 2,534,034 | La Brie | Dec. 12, 1950 |
| 2,624,435 | Stephenson | Jan. 6, 1953 |
| 2,910,159 | Nielsen | Oct. 27, 1959 |
| 2,919,000 | Claytor | Dec. 29, 1959 |
| 2,956,655 | Ferris et al. | Oct. 18, 1960 |
| 3,123,169 | Young et al. | Mar. 3, 1964 |

FOREIGN PATENTS

| | | |
|---|---|---|
| 572,611 | Great Britain | Oct. 16, 1945 |